United States Patent
Bradford et al.

(10) Patent No.: US 8,378,519 B2
(45) Date of Patent: Feb. 19, 2013

(54) REDUNDANT POWER SYSTEM SWITCH FOR BACKUP POWER SWITCHING WITHOUT POWER INTERRUPTION

(75) Inventors: Curtis Bradford, Los Gatos, CA (US); Surendra Patel, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 606 days.

(21) Appl. No.: 12/620,677

(22) Filed: Nov. 18, 2009

(65) Prior Publication Data

US 2011/0115291 A1    May 19, 2011

(51) Int. Cl.
*H02J 1/10* (2006.01)

(52) U.S. Cl. .......................................... 307/29; 307/141

(58) Field of Classification Search .................. 307/18, 307/23, 29, 141
See application file for complete search history.

(56) References Cited

U.S. PATENT DOCUMENTS

| | | | | |
|---|---|---|---|---|
| 4,908,790 A | * | 3/1990 | Little et al. | 714/14 |
| 5,945,816 A | * | 8/1999 | Marusik | 323/273 |
| 6,225,708 B1 | * | 5/2001 | Furukawa et al. | 307/66 |
| 7,608,947 B2 | * | 10/2009 | Anderson et al. | 307/87 |
| 2006/0012336 A1 | * | 1/2006 | Fujita | 320/119 |

* cited by examiner

*Primary Examiner* — Daniel Cavallari

(74) *Attorney, Agent, or Firm* — Harrity & Harrity, LLP

(57) ABSTRACT

A redundant power system may include a first switch that connects between a redundant power source and a first remote system, a second switch that connects between the redundant power source and a second remote system, and a control circuit. The control circuit may apply a first control signal to the first switch to cause the redundant power source to connect through the first switch to the first remote system via a switched connection. The control circuit may determine if the second remote system requires power, and may apply a second control signal to the first switch to open the switched connection when the high priority remote system requires power. The control circuit may apply a third control signal to the second switch, upon an expiration of a delay timer, to cause the redundant power source to connect through the second switch to the second remote system.

25 Claims, 4 Drawing Sheets

REDUNDANT POWER SYSTEM SWITCH FOR BACKUP POWER SWITCHING WITHOUT POWER INTERRUPTION

BACKGROUND

A redundant power system, which includes a redundant power source, may selectively supply power to remote systems, which may include remote power sources and/or remote loads. In the case of back-up of remote power sources, the redundant power system monitors the remote power sources to detect when any of the remote power sources requires take-over (i.e., remote power source is failing, or lacks capacity to supply adequate power to the load) by the redundant power system before the operation of the loads of the remote power sources may be affected.

SUMMARY

In accordance with one embodiment, a redundant power system may include a redundant power source and a first switch connected between the redundant power source and a low priority remote system, where the first switch has a characteristic of turning off faster than the first switch turns on. The redundant power system may further include a second switch connected between the redundant power source and a high priority remote system, where the second switch has a characteristic of turning off faster than the second switch turns on. The redundant power system may also include a control circuit to: apply a first control signal to the first switch to cause the redundant power source to connect through the first switch to the low priority remote system via a switched connection, determine if the high priority remote system requires redundant power, apply a second control signal to the first switch to open the switched connection when the high priority remote system requires redundant power, initiate a delay timer, and apply a third control signal to the second switch, upon an expiration of the delay timer, to cause the redundant power source to connect through the second switch to the high priority remote system.

In another implementation, a switch may include a first metal-oxide semiconductor field effect transistor (MOSFET) having a source, drain and gate, where the drain of the first MOSFET is coupled to a redundant power source, and a second MOSFET having a source, drain and gate, where the source of the second MOSFET is connected to the source of the first MOSFET, where the gate of the second channel MOSFET is connected to the gate of the first MOSFET, and where the drain of the second MOSFET is coupled to a remote system. The switch may further include a first diode connected across the source and drain of the first MOSFET, a second diode connected across the source and drain of the second MOSFET, and input circuitry to receive a control signal from a control circuit, where the input circuitry applies a voltage to the gate of the first MOSFET and to the gate of the second MOSFET, based on the control signal, to control whether the switch is in an open state or a closed state.

In still another implementation, a redundant power system may include a redundant power source, a first switch connected between the redundant power source and a first remote system, and a second switch connected between the redundant power source and a second remote system. Each of the first and second switches may include: a first field effect transistor (MOSFET) having a source, drain and gate, where the drain of the first FET is coupled to the redundant power source; and a second FET having a source, drain and gate, where the source of the second FET is connected to the source of the first FET, where the gate of the second FET is connected to the gate of the first FET, and where the drain of the second FET is coupled to the respective first or second remote system. The redundant power system may further include a control circuit to: apply a first control signal to the first switch to cause the redundant power source to connect through the first switch to the first remote system via a switched connection, apply a second control signal to the first switch to open the switched connection if the second remote system requires redundant power, initiate a delay timer, and apply a third control signal to the second switch, upon an expiration of the delay timer, to cause the redundant power source to connect through the second switch to the second remote system.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

In some uses of a redundant power system, a redundant power system may provide power back-up to different remote systems in which one or more of the remote systems are considered to have priority over one or more others of the remote systems. Therefore, one or more of the remote systems can be considered to be "low priority" systems, and one or more other of the remote systems can be considered to be "high priority" systems. In some implementations of such a redundant power system, the redundant power system may lack the capacity to supply back-up power to the "low priority" systems at the same time that it supplies back-up power to the "high priority" systems.

Exemplary embodiments described herein implement a redundant power system in which power may be selectively supplied from the redundant power system to either a low priority remote system or a high priority remote system. A control circuit of the redundant power system may initially close a first switch so as to supply power to a low priority remote system. Upon a determination that the high priority remote system requires redundant power, the control circuit may open the first switch, so as to disconnect the low priority remote system from the redundant power source, and then may initiate a timer delay. Upon expiration of the timer delay, the control circuit may close a second switch so as to supply power from the redundant power source to the high priority remote system. Each of the first and second switches may have circuit designs that permit the switches to turn off faster than they turn on. By use of the timer delay, in conjunction with the design of the first and second switches, back-up power, having limited availability, may be switched from one remote system to another while at the same time ensuring that a higher priority remote system will continue to operate properly in the event of a local power failure.

Exemplary Redundant Power System

Figure 1:
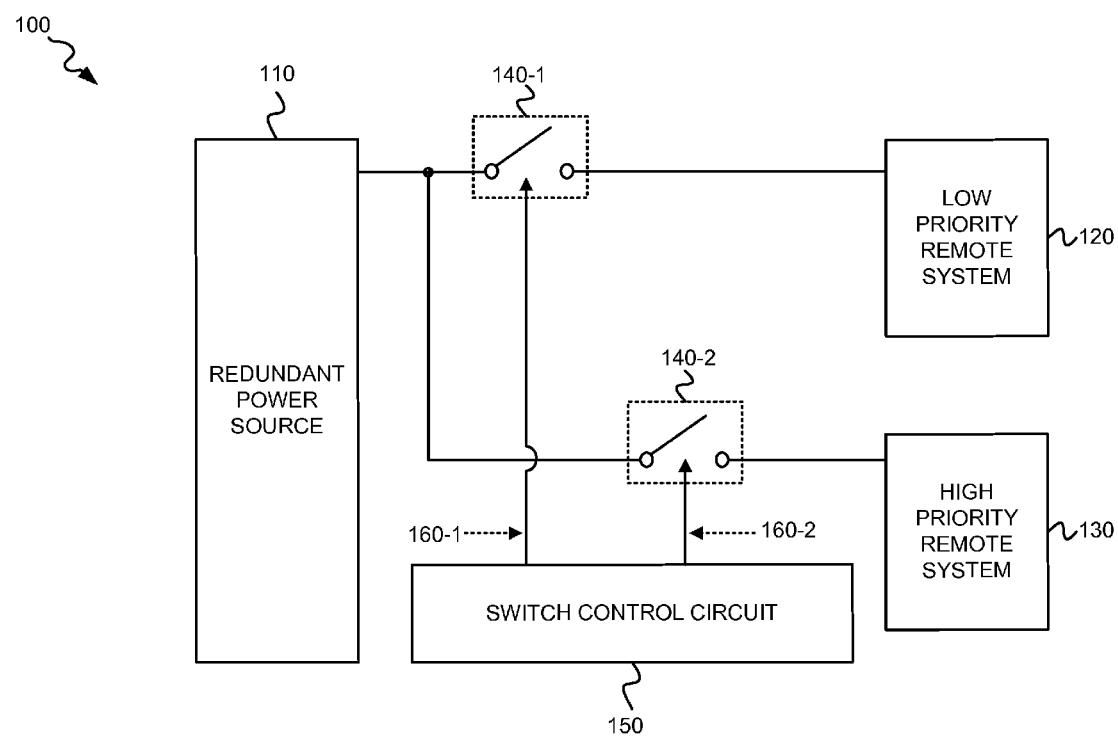
FIG. 1 is a diagram of an exemplary redundant power system in which a redundant power source may be selectively switched to supply power to either a low priority remote system or to a high priority remote system.

FIG. 1 is a diagram of an exemplary redundant power system 100 in which a redundant power source 110 may be selectively switched to supply power to either a low priority remote system 120 or a high priority remote system 130. As shown, redundant power system 100 may include a redundant power source 110, a low priority remote system 120, a high priority remote system 130, switches 140-1 and 140-2 and a switch control circuit 150.

Redundant power source 110 may include a power source, such as, for example, a power supply that may supply power (e.g., voltage and current) to either low priority remote system 120 or high priority remote system 130 via respective switches 140-1 or 140-2. In one exemplary embodiment, redundant power source 110 may not have enough capacity to simultaneously supply power to both low priority remote system 120 and high priority remote system 130. In this exemplary embodiment, switch control circuit 150 may control a timing of the switching of switches 140-1 and 140-2 to selectively connect redundant power source 110 through to low priority remote system 120 or to high priority remote system 130.

Low priority remote system 120 may include a remote power source and/or a remote load that may receive power from redundant power source 110, when switch control circuit 150 switches switch 140-1 to connect redundant power source 110 through to low priority remote system 120. High priority system 130 may include a remote power source and/or a remote load that may receive power from redundant power source 110, when switch control circuit 150 switches switch 140-2 to connect redundant power source 110 through to high priority remote system 130.

Switch 140-1 may include circuitry that may switch the supply of power from redundant power source 110 to low priority remote system 120 based on a control signal 160-1 from switch control circuit 150. Switch 140-2 may include circuitry that may switch the supply of power from redundant power source 110 to high priority remote system 130 based on a control signal 160-2 from switch control circuit 150. Switches 140-1 and 140-2 may include circuitry that turns off the supply of power to remote systems 120 and 130, respectively, faster than the switches turn on the supply of power to remote systems 120 and 130. Exemplary implementations of switches 140-1 and 140-2 are described below with respect to FIGS. 2 and 3. Either of the exemplary implementations depicted in either FIG. 2 or FIG. 3 may be used for each of switches 140-1 and 140-2.

Switch control circuit 150 may selectively supply control signal 160-1 to switch 140-1 to turn switch 140-1 on or off. Switch control circuit 150 may selectively supply control signal 160-2 to switch 140-2 to turn switch 140-2 on or off. Switch control circuit 150 may apply a delay between turning off switch 140-1 (i.e., opening switch 140-1) and turning on switch 140-2 (i.e., closing switch 140-2). Via application of this delay, switch control circuit 150 may cause a delay between turning off the supply of power to low priority remote system 120 and turning on the supply of power to high priority remote system 130. The delay applied by switch control circuit 150 between turning off switch 140-1 and turning on switch 140-2 should be sufficiently short to ensure that high priority remote system 130 receives the supply of power from redundant power source 110 in time to prevent power failure, but long enough to ensure that low priority remote system 120 has been disconnected. Switch control circuit 150 may implement an internal delay timer (not shown) for applying the delay between the turning off of switch 140-1 and the turning on of switch 140-2.

First Exemplary Switch

Figure 2:
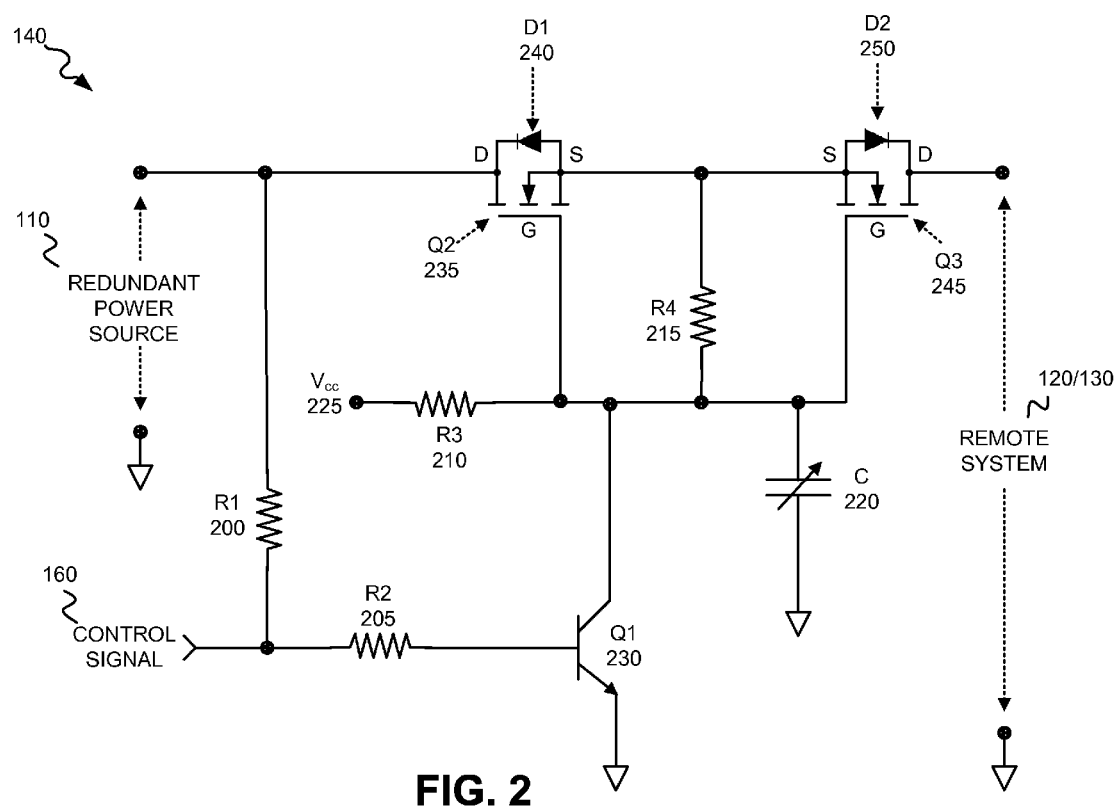
FIG. 2 is a diagram of a first exemplary switch that may be used in the redundant power system of FIG. 1.

FIG. 2 depicts a first exemplary implementation of a switch 140 that may be used for either of switches 140-1 or 140-2 shown in FIG. 1. Switch 140 may switch power from redundant power source 110 to one of remote systems 120 or 130 based on a control signal 160 received from switch control circuit 150. As shown in the exemplary implementation of FIG. 2, switch 140 may include various circuit components which operate in conjunction to switch power from redundant power source 110 to remote system 120 or 130. Such circuit components may include a resistor R1 200, a resistor R2 205, a resistor R3 210, a resistor R4 215, a capacitor C 220, a direct current (DC) voltage supply $V_{cc}$ 225, an NPN bi-polar junction transistor (BJT) Q1 230, an N-channel metal-oxide semiconductor field effect transistor (MOSFET) Q2 235, a diode D1 240, an N-channel MOSFET Q3 245, and a diode D2 250. In one exemplary embodiment, resistor R1 200 may equal 51 kΩ, resistor R2 205 may equal 47Ω, resistor R3 210 may equal 10 kΩ, resistor R4 215 may equal 10 kΩ, Vcc 225 may equal 20 volts DC (VDC), redundant power source 110 may equal 12 VDC, and C 220 may equal 0.1 µF. N-channel MOSFETs Q2 235 and Q3 245 may include enhanced mode (enh) N-channel MOSFETs.

Supply voltage $V_{cc}$ 225 may be set to a voltage level higher than a voltage level of redundant power source 110. In one exemplary embodiment, as described above, redundant power source 110 may have a voltage level of 12 VDC, and supply voltage $V_{cc}$ 225 may be set to a voltage level of 20 VDC.

Resistors R1 200 and R2 205, in conjunction with supply voltage Vcc 225 and redundant power source 110, may operate to bias transistor Q1 230. Upon receipt of a high voltage level via control signal 160, transistor Q1 230 turns on, shorting the gates of MOSFETs Q2 235 and Q3 245 to ground, and thereby turning MOSFETs Q2 235 and Q3 245 off (i.e., opening switch 140 between redundant power source 110 and remote system 120/130). Upon receipt of a low voltage level via control signal 160, transistor Q1 230 turns off, causing a high voltage to be applied to the gates of MOSFETs Q2 235 and Q3 245, thereby turning MOSFETs Q2 235 and Q3 245 on (i.e., closing switch 140 between redundant power source 110 and remote system 120/130). The high voltage applied at the gates of MOSFETs Q2 235 and Q3 245 may be determined by the voltage level of supply voltage Vcc 225 and by the voltage divider created by resistors R3 210 and R4 215.

BJT Q1 230, as bi-polar junction transistor, includes the inherent characteristic of turning on more rapidly than it turns off. Capacitor C 220 may also add extra capacitance that can further affect the speed at which BJT Q1 230 turns off (i.e., a larger capacitance value for capacitor C 220 may cause BJT Q1 230 to turn off slower, a smaller capacitance value for capacitor C 220 may cause BJT Q1 230 to turn off more quickly). In one exemplary embodiment, capacitor C 220 may include a variable capacitor, as shown in FIG. 2, to adjust the turn off speed of switch 140. Since BJT Q1 230 turns on more rapidly than it turns off, MOSFETs Q2 235 and Q3 245, whose gate voltages are determined by BJT Q1 230, turn off more rapidly than MOSFETs Q2 235 and Q3 245 turn on.

The components depicted in FIG. 2 are exemplary. Switch 140 of FIG. 2 may have more, fewer, different and/or differently arranged components than those shown in FIG. 2.

Second Exemplary Switch

Figure 3:
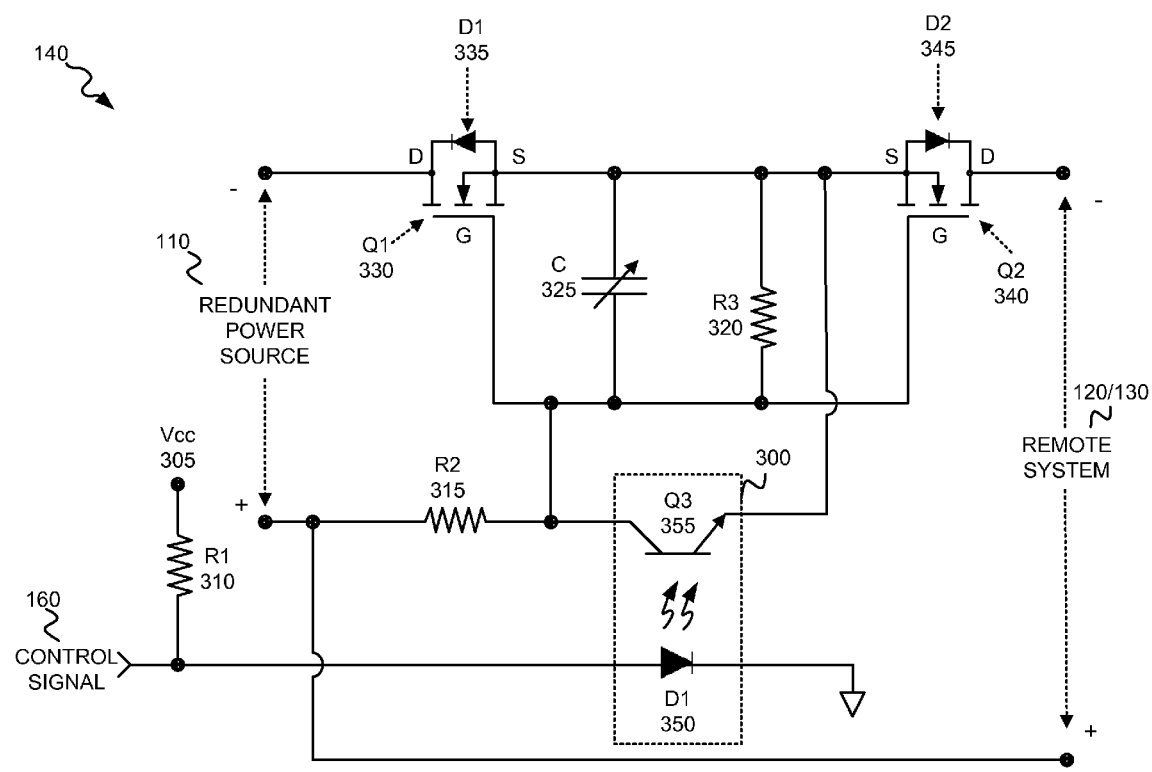
FIG. 3 is a diagram of a second exemplary switch that may be used in the redundant power system of FIG. 1.

FIG. 3 depicts a second exemplary implementation of a switch 140 that may be used for either of switches 140-1 or 140-2 shown in FIG. 1. Switch 140 may switch power from redundant power source 110 to one of remote systems 120 or 130 based on a control signal 160 received from switch control circuit 150. As shown in the exemplary implementation of FIG. 3, switch 140 may include an opto-isolator 300, a supply voltage Vcc 305, a resistor R1 310, a resistor R2 315, a resistor R3 320, a capacitor C 325, an N-channel MOSFET Q1 330, a diode D1 335, an N-channel MOSFET Q2 340, and a diode D2 345. Opto-isolator 300 may isolate the control circuit (e.g., switch control circuit 150) from the switching portion of switch 140. Opto-isolator 300 may include a light emitting diode (LED) D1 350 and a phototransistor Q3 355. In one exemplary embodiment, resistor R1 310 may equal 2.2 kΩ, resistor R2 315 may equal 51 kΩ, resistor R3 320 may equal 10 kΩ, capacitor C 325 may equal 0.01 μF, $V_{cc}$ 305 may equal 12 VDC, and redundant power source 110 may equal –52 VDC. MOSFETs Q1 330 and Q2 340 may include enhanced mode N-channel MOSFETs.

Upon receipt of a high voltage level via control signal 160, LED D1 350 of opto-isolator 300 may emit light that may be received by phototransistor Q3 355. Receipt of light from LED D1 350 may turn on phototransistor Q3 355, thereby shorting capacitor C 325 and resistor R3 320 together (i.e., making the voltage across C 325 and R3 320 approximately equal to zero). Shorting C 325 and R3 320 together turns off MOSFETs Q1 330 and Q2 340 (i.e., causing switch 140 to open between redundant power source 110 and remote system 120/130).

Upon receipt of a low voltage level via control signal 160, LED D1 350 of opto-isolator 300 may discontinue any emission of light that was previously being received by phototransistor Q3 355. When LED D1 350 does not emit light towards phototransistor Q3 355, Q3 355 may turn off, causing a voltage to be applied to the gates of MOSFETs Q1 330 and Q2 340 via a voltage divider created by resistors R2 315 and R3 320. Application of the voltage to the gates of MOSFETs Q1 330 and Q2 340 causes MOSFETs Q1 330 and Q2 340 to turn on (i.e., causing switch 140 to close and connect redundant power source 110 to remote system 120/130).

The components depicted in FIG. 3 are exemplary. Switch 140 of FIG. 3 may have more, fewer, different and/or differently arranged components than those shown in FIG. 3.

Exemplary Process

Figure 4:
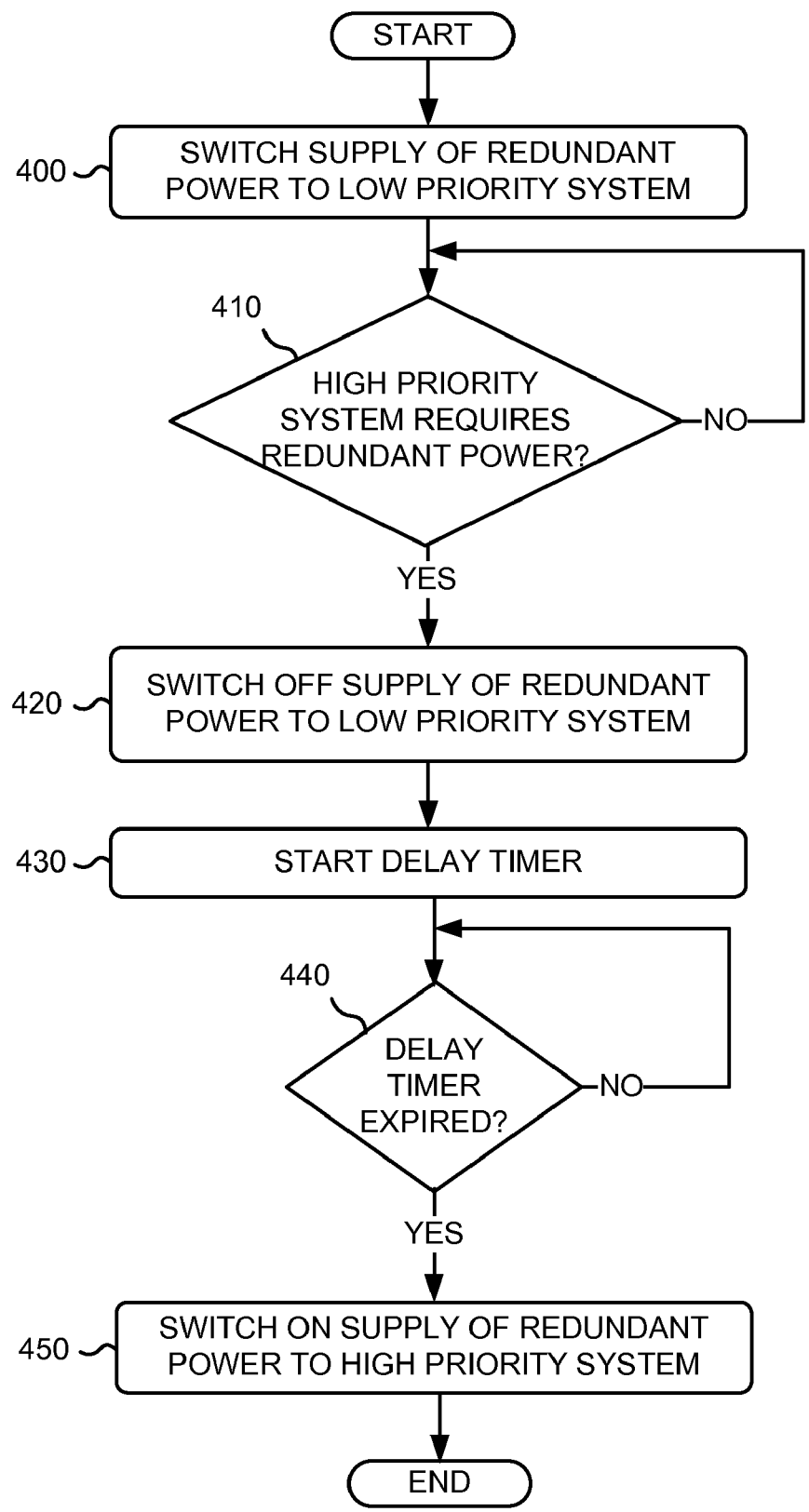
FIG. 4 is a flow chart that illustrates an exemplary process for switching the supply of redundant power from a low priority remote system to a high priority remote system.

FIG. 4 is a flow chart that illustrates an exemplary process for switching the supply of redundant power from a low priority remote system to a high priority remote system. The exemplary process of FIG. 4 may be implemented by switch control circuit 150, in conjunction with redundant power source 110 and switches 140-1 and 140-2. In other embodiments, some or all of the blocks described below may be performed by another component(s) of system 100, or by components not shown in FIG. 1.

The exemplary process may include switching the supply of redundant power to low priority remote system 120 (block 400). Switch control circuit 150 may send control signal 160-1 to switch 140-1 to cause switch 140-1 to close and connect redundant power source 110 through to low priority remote system 120. Switch 140-1 may close and connect redundant power source 110 through to low priority remote system 120 in accordance with the switch operation described above with respect to either of the two exemplary implementations of FIG. 2 or 3. It may be determined if high priority system 130 requires redundant power (block 410). Switch control circuit 150 may receive a signal indicating that high priority remote system 130 requires redundant power. The signal may indicate that a power source associated with high priority remote system 130 may be failing.

The supply of redundant power may be switched off to low priority remote system 120 (block 420). Switch control circuit 150 may send control signal 160-1 to switch 140-1 to cause switch 140-1 to open and disconnect the supply of power from redundant power source 110 to low priority remote system 120. Switch 140-1 may open and disconnect redundant power source 110 from supplying power to low priority remote system 120 in accordance with the switch operation described above with respect to either of the two exemplary implementations of FIG. 2 or 3.

A delay timer may be started (block 430). Switch control circuit 150 may initiate an internal delay timer which counts for a specified maximum timer interval before expiring (i.e., a maximum period of time). The maximum timer interval may, for example, be set to a maximum period of time of 100 ms. It may be determined if the delay timer has expired (block 440). Switch control circuit 150 may determine if the internal delay timer has reached its specified maximum timer interval (i.e., timer interval has expired).

If the delay timer interval has not expired (block 440—NO), then the exemplary process may return to block 440. If the delay timer interval has expired (block 440—YES), then the supply of redundant power may be switched to high priority remote system 130 (block 450). Switch control circuit 150 may send control signal 160-2 to switch 140-2 to cause switch 140-2 to close and connect redundant power source 130 through to high priority remote system 130. Switch 140-2 may close and connect redundant power source 110 through to high priority remote system 130 in accordance with the switch operation, as described above with respect to either of the two exemplary embodiments of FIG. 2 or 3.

CONCLUSION

As described herein, a redundant power system may supply back-up power, having limited availability, to a high priority remote system by switching the back-up power from a low priority system to the high priority remote system. The redundant power system may use a timer delay to institute a delay between opening a first switch to disconnect power being supplied to the low priority remote system, and closing a second switch to connect power to the high priority system. Each of the first and second switches may also have circuit designs that permit the switches to turn off faster than they turn on, thus, ensuring, in conjunction with use of the timer delay, that the high priority remote system continues to operate properly in the event of a local power failure to the high priority remote system.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While series of blocks have been described in FIG. 4, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A redundant power system, comprising:
    a redundant power source;
    a first switch connected between the redundant power source and a first remote system,
        the first switch comprising a characteristic of turning off faster than the first switch turns on;
    a second switch connected between the redundant power source and a second remote system,
        the second switch comprising a characteristic of turning off faster than the second switch turns on; and
    a control circuit to:
        apply a first control signal to the first switch to cause the redundant power source to connect through the first switch to the first remote system via a switched connection,
        determine if the second remote system requires power,
        apply a second control signal to the first switch to open the switched connection when the second remote system requires the power,
        initiate a delay timer, and
        apply a third control signal to the second switch, upon an expiration of the delay timer, to cause the redundant power source to connect through the second switch to the second remote system.

2. The redundant power system of claim 1, where each of the first switch and the second switch includes:
    a first metal-oxide semiconductor field effect transistor (MOSFET) that includes a first source, a first drain, and a first gate,
        where the first drain of the first MOSFET is coupled to the redundant power source; and
    a second MOSFET that includes a second source, a second drain, and a second gate,
        where the second source of the second MOSFET is connected to the first source of the first MOSFET,
        where the second gate of the second MOSFET is connected to the first gate of the first MOSFET, and
        where the second drain of the second MOSFET is coupled to the first remote system or the second remote system.

3. The redundant power system of claim 2, where the first switch further includes:
    input circuitry to:
        receive the first control signal or the second control signal from the control circuit,
        apply, based on receiving the first control final or the second control signal, a voltage to the first gate of the first MOSFET and to the second gate of the second MOSFET to cause the first switch to comprise an open state or a closed state.

4. The redundant power system of claim 3, where the input circuitry is further to:
    apply the voltage to the first gate of the first MOSFET and to the second gate of the second MOSFET to turn off the first MOSFET and the second MOSFET and open the switched connection between the redundant power source and the first remote system.

5. The redundant power system of claim 3, where the input circuitry comprises a transistor including a base, an emitter, and a collector,
    where the base is to receive the first control signal or the second control signal, and
    where the collector is connected to the first gate of the first MOSFET and the second gate of the second MOSFET.

6. The redundant power system of claim 5, where the transistor includes a bi-polar junction transistor (BJT).

7. The redundant power system of claim 3, where the input circuitry comprises an opto-isolator that includes a light emitting diode (LED) and a phototransistor, and
    where the LED is to:
        receive the first control signal or the second control signal, and
        transmit light to the phototransistor based on receiving the first control signal or the second control signal.

8. The redundant power system of claim 7, where a collector of the phototransistor is connected to the first gate of the first MOSFET and the second gate of the second MOSFET, and
    where an emitter of the phototransistor is connected to the first source of the first MOSFET and the second source of the second MOSFET.

9. The redundant power system of claim 8, where the phototransistor is to:
    receive the light from the LED,
    open, based on receiving the light, a connection between the redundant power source and the first remote system by causing the first MOSFET and the second MOSFET to turn off.

10. The redundant power system of claim 2, where the second switch includes:
    input circuitry to:
        receive the third control signal from the control circuit,
        apply, based on receiving the third control signal, a voltage to the first gate of the first MOSFET and to the second gate of the second MOSFET to cause the second switch to comprise an open state or a closed state.

11. The redundant power system of claim 10, where the input circuitry is further to:
    apply the voltage to the first gate of the first MOSFET and to the second gate of the second MOSFET to turn on the first MOSFET and the second MOSFET and connect the redundant power source to the second remote system.

12. The redundant power system of claim 2, where the first MOSFET and the second MOSFET each comprise an N-channel MOSFET.

13. The redundant power system of claim 2, where the first MOSFET and the second MOSFET each comprise an enhanced mode N-channel MOSFET.

14. The redundant power system of claim 2, where the first MOSFET further includes:
    a first diode connected across the first source and the first drain of the first MOSFET; and
    where the second MOSFET further includes:

a second diode connected across the second source and the second drain of the second MOSFET.

15. A system, comprising:
a first switch connected between a redundant power source and a first remote system;
a second switch connected between the redundant power source and a second remote system,
where each of the first switch and the second switch including:
a first field effect transistor (FET) including a first source, a first drain, and a first gate, where the first drain is coupled to the redundant power source,
a second FET including a second source, a second drain, and a second gate,
the second source being connected to the first source, the second gate being connected to the first gate, and the second drain being coupled to the first remote system or the second remote system; and
a control circuit to:
apply a first control signal to the first switch to cause the redundant power source to connect through the first switch to the first remote system via a switched connection,
apply a second control signal to the first switch to open the switched connection if the second remote system requires redundant power,
initiate a delay timer, and
apply a third control signal to the second switch, upon an expiration of the delay timer, to cause the redundant power source to connect through the second switch to the second remote system.

16. The system of claim 15, where the first switch further includes:
first input circuitry to:
receive the first control signal or the second control signal from the control circuit,
apply, based on receiving the first control signal or the second control signal, a voltage to the first gate of the first MOSFET and to the second gate of the second MOSFET to cause the first switch to comprise an open state or a closed state.

17. The system of claim 16, where the first input circuitry is further to:
apply the voltage to the first gate of the first MOSFET and to the second gate of the second MOSFET to turn off the first MOSFET and the second MOSFET and open the switched connection between the redundant power source and the first remote system.

18. The system of claim 17, where the second switch includes:
second input circuitry to:
receive the third control signal from the control circuit,
apply, based on receiving the third control signal, a voltage to the first gate of the first MOSFET and to the second gate of the second MOSFET to cause the second switch to comprise an open state or a closed state.

19. The system of claim 18, where the second input circuitry is further to:
apply the voltage to the first gate of the first MOSFET and to the second gate of the second MOSFET to turn on the first MOSFET and the second MOSFET and connect the redundant power source to the second remote system.

20. The system of claim 16, where the first input circuitry of the first switch comprises a transitory that includes a base, an emitter, and a collector,
where the base is to receive the first control signal or the second control signal, and
where the collector is connected to the first gate of the first MOSFET and the second gate of the second MOSFET.

21. The system of claim 20, where the transistor includes a bi-polar junction transistor.

22. The system of claim 16, where the first input circuitry comprises an opto-isolator that includes a light emitting diode (LED) and a phototransistor, and
where the LED is to:
receive the first control signal or the second control signal, and
transmit light to the phototransistor based on receiving the first control signal or the second control signal.

23. The system of claim 22, where a collector of the phototransistor is connected to the first gate of the first MOSFET and the second gate of the second MOSFET, and
where an emitter of the phototransistor is connected to the first source of the first MOSFET and the second source of the second MOSFET.

24. The system of claim 23, where the phototransistor is to:
receive the light from the LED,
open, based on receiving the light, a connection between the redundant power source and the first remote system by causing the first MOSFET and the second MOSFET to turn off.

25. The system of claim 15, where the first MOSFET and the second MOSFET each comprise an N-channel MOSFET.

* * * * *

UNITED STATES PATENT AND TRADEMARK OFFICE
CERTIFICATE OF CORRECTION

PATENT NO. : 8,378,519 B2
APPLICATION NO. : 12/620677
DATED : February 19, 2013
INVENTOR(S) : Curtis Bradford et al.

Page 1 of 1

It is certified that error appears in the above-identified patent and that said Letters Patent is hereby corrected as shown below:

Column 7, claim 3, line 65 should read: "apply, based on receiving the first control signal or the"

Signed and Sealed this
Second Day of April, 2013

Teresa Stanek Rea
*Acting Director of the United States Patent and Trademark Office*